United States Patent

Noyori et al.

[15] 3,705,273

[45] Dec. 5, 1972

[54] MAGNETIC RECORDING AND REPRODUCING APPARATUS

[72] Inventors: Yasuyuki Noyori; Eiji Uehira; Tadao Katayama, all of Kobe, Japan

[73] Assignee: Fujitsu Limited, Kawasaki, Japan

[22] Filed: Oct. 21, 1971

[21] Appl. No.: 191,210

[30] Foreign Application Priority Data

Oct. 23, 1970 Japan ................................45/93214

[52] U.S. Cl..............179/100.2 Z, 179/100.2 MD 242/55.19A, 274/4 c

[51] Int. Cl..........................G11b 21/08, G11b 23/04

[58] Field of Search..........179/100.2 Z, 100.2 MD, 100.2 R, 179/100.2 CA; 274/4 D, 4 E, 11 F, 11 D; 242/55.19 A, 197, 200; 226/46, 47, 49, 176

[56] References Cited

UNITED STATES PATENTS

| | | | |
|---|---|---|---|
| 3,656,761 | 4/1972 | Laschenski | 179/100.2 Z |
| 3,641,279 | 2/1972 | Ganske | 179/100.2 MD |
| 3,419,686 | 12/1968 | Rhoades | 179/100.2 MD |
| 3,037,093 | 5/1962 | Nowland | 179/100.2 MD |

*Primary Examiner*—Terrell W. Fears
*Assistant Examiner*—Alfred H. Eddleman
*Attorney*—Arthur E. Wilfond

[57] ABSTRACT

A magnetic recording and reproducing apparatus which is provided with recording and reproducing functions in both forward and backward directions of a tape and a tape position selecting function in accordance with a recording mode. In order to enable carrying out of recording and reproducing operations in both forward and backward directions of a tape, two capstans and two pinch rollers are provided on both sides of magnetic heads opposed to upper and power tracks of a tape. In addition, a special cam mechanism and a selector switch which selectively control the positions of the two pinch rollers are provided. A level discriminating circuit which detects the interrupting time of a reproducing signal is provided in a mechanism in order to select a recording position of a tape, so that a rapid winding mode for the two pinch rollers is maintained by the output.

6 Claims, 10 Drawing Figures

MAGNETIC RECORDING AND REPRODUCING APPARATUS

The invention relates to an improved magnetic recording and reproducing apparatus, and in particular, to a new type of magnetic recording and reproducing apparatus in a form using a cassette tape, which is provided with recording and reproducing functions in both forward and backward directions of a tape and a tape position selecting function in accordance with a recording mode.

Most of the conventionally known types of magnetic recording and reproducing apparatus substantially consist of recording and reproducing operations by driving in the forward direction of a tape, a rapid winding operation and a rewinding operation. In order to change over from a recording or reproducing mode on the upper or lower track of a tape to a recording or reproducing mode on the lower or upper track of the tape, therefore, it is necessary to turn over the tape and reset it. Especially during reproduction of a musical tape, moreover, it might be convenient if only a favorite tune would be selected and reproduced or if a same tune could be repeatedly reproduced, but a considerably tedious operation is necessary to satisfy such a requirement with the conventional rapid winding and rewinding operations. Such a tedious operation in a conventional type of apparatus is undesirable, particularly when it is used as an entertaining instrument in a car, from a viewpoint of safety driving.

An object of the invention accordingly is to provide magnetic recording and reproducing apparatus having a changing-over function of recording and reproducing modes for a tape track without turning over the tape.

Another object of the invention is to provide magnetic recording and reproducing apparatus having a tape position selecting function in accordance with a recording mode.

Magnetic recording and reproducing apparatus of the invention comprises two capstans and two pinch rollers provided on both sides of magnetic heads opposite the upper and lower tracks of a tape. A special cam mechanism and a selector switch selectively control the positions of the pinch rollers. A level discriminating circuit detects the interrupting time of a reproducing signal in order to provide a tape position selecting function so that the rapid winding mode for the two pinch rollers is maintained by the output.

In accordance with the invention, magnetic recording and reproducing apparatus including a magnetic tape and magnetic heads in operative proximity with the tape comprises a pair of capstans rotating in opposite directions on both sides of a magnetic head and in operative proximity with the tape. Each of a pair of pinch rollers is mounted on a lever positioned opposite a corresponding one of the capstans on the other side of and in operative proximity with the tape. Electrical driving means is coupled to a cam shaft for rotating said cam shaft. A cam plate is affixed to the cam shaft for rotation therewith. The cam plate controls the position of the lever relative to the tape. A forward direction selector switch is affixed to the cam shaft and has a plurality of contactors which open and close electrical contacts in accordance with the rotary position of the switch. A backward direction selector switch is affixed to the cam shaft and has a plurality of contactors which open and close electrical contacts in accordance with the rotary position of the switch. A double contact point switch is connected between a source of voltage and the contactors of the forward direction selector switch in one position and between the source of voltage and the contactors of the backward direction selector switch in another position. Energizing means having a forward selecting switch and a backward selecting switch selectively changes the position of the double contact point switch. Circuit means connects the energizing means through the contactors of the forward and backward direction selector switches to the electrical driving means in a manner whereby electrical energy is supplied to the driving means in accordance with the position of the lever relative to the tape and therefore in accordance with the position of the pinch rollers mounted thereon relative to the tape.

The lever and therefore the pinch rollers mounted thereon are positionable in three different positions relative to the tape.

The electrical driving means comprises a solenoid plunger having a pawl, the solenoid plunger and the cam shaft are coupled by a ratchet wheel.

Each of the forward and backward direction selector switches comprises a sliding disk having an insulating plate having conductive patterns on both surfaces thereof, and two sets of contactors each for a corresponding one of the conductive patterns, each set having three contactors. The disks are affixed to the cam shaft for rotation therewith.

The lever has a pair of spaced holes formed therein and being affixed to the base plate in spaced relation therewith. The base plate has a pair of spaced holes formed therethrough. Holding members are movably mounted on the base plate for supporting the pinch rollers. Each of a pair of deviating pins extends from a corresponding one of the holding members and each passes through a corresponding hole through the base plate and a corresponding hole through the lever.

The circuit means includes another double contact point switch interposed between the first-mentioned double contact point switch and a direction selector switch. Energizing means having a tune selecting switch selectively changes the position of the other double contact point switch. The other double contact point switch returns to its other position when a non-recording portion of the tape is detected by the magnetic head.

The aforedescribed combination of two functions enables a changeover of the recording and reproducing operation in the forward direction from/to the recording and reproducing operation in the backward direction and carrying out by one touch the selecting operation of a recording position of a tape in both forward and backward directions. Above all, the combination provides a use like a juke box during the reproduction of a musical tape.

In order that the invention may be readily carried into effect, it will now be described with reference to the accompanying drawings, wherein:

FIG. 1 is a schematic diagram of an embodiment of the magnetic recording and reproducing apparatus of the invention;

FIGS. *2a*, *2b*, *2c* and *2d* are graphical presentations of waveforms illustrating the operation of the apparatus;

Figure 1:
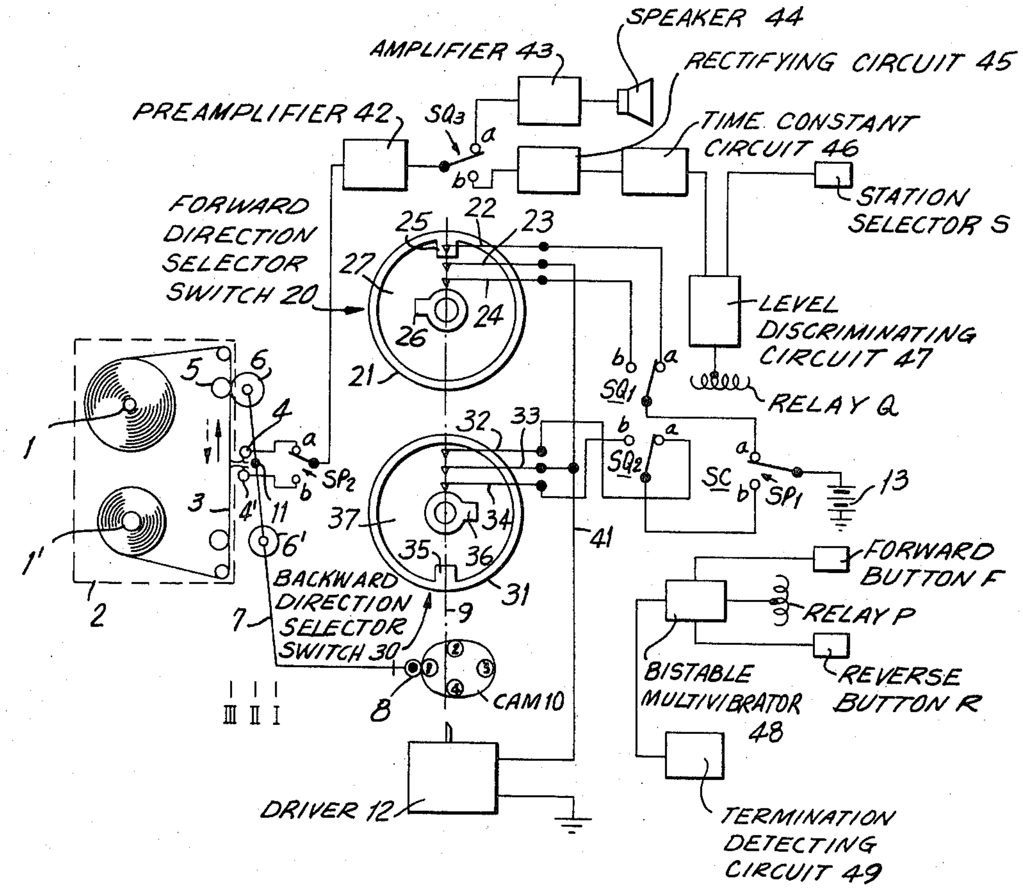

In FIG. 1, two magnetic heads 4 and 4' are arranged opposite the upper and lower tracks of a tape 3 in front of a cassette 2. The tape 3 is loaded on reel shafts 1 and 1'. Two capstans 5 and 5' rotate in opposite directions. Two pinch rollers 6 and 6' are opposite the capstans 5 and 5' on both sides of the magnetic heads 4 and 4'. The pinch rollers 6 and 6' are supported by a common lever 7.

The lever 7 deviates with a shaft 11 in the center due to the action of a cam roller 8 provided at the end of an extension of the lever and a cam 10 fitted to a cam shaft 9. The cam 10 is formed in such a shape that it gives at least three different deviating positions to the lever 7 when it rotates by one turn. In the first deviating position I of the lever 7, the pinch roller 6 on one side turns out to press the tape 3 against the capstan 5. In the second deviating position II, both pinch rollers 6 and 6' turn out to be apart from the capstans 5 and 5'. When the lever 7 is moved to the third deviating position, the pinch roller 6' on the other side turns out to press the tape 3 against the capstan 5'.

A driver or driving means 12 such as, for example, a pawl feed mechanism, is coupled to the cam shaft 9 in order to rotate the cam 10. Driving current is supplied to the driver 12 from a power source 13 through a switch circuit SC. The switch circuit SC comprises a first double contact point switch $SP_1$ connected at one end to the power source 13. A contact point *a* thereof is connected through a second double contact point switch $SQ_1$ to the driving means 12 through a forward direction selector switch 20. A contact point *b* of the switch $SP_1$ is connected via a double contact point switch $SQ_2$ to the driving means 12 through a backward direction selector switch 30.

The forward direction selector switch 20 and the backward direction selector switch 30 consist mainly of sliding disks 21 and 31 which are fitted to the cam shaft 9, and three contactors 22, 23 and 24, and 32, 33 and 34, respectively, for the sliding disks. A conductive pattern 27 is formed on the surface of the sliding disk 21. The conductive pattern 27 is in a form leaving insulating parts 25 and 26 on a part of the circumference wherein the first contactor 22 comes into contact therewith and a part of the circumference wherein the third contactor 24 comes into contact therewith. The first and the third contactors 22 and 24 come into contact with the sliding disk 21 and are connected to the *a* and *b* contact points of the switch $SQ_1$. The second contactor 23 is connected to the driving means 12 through a common conductor 41.

Similarly, a conductive pattern 37 is formed on the surface of the sliding disk 31. The conductive pattern 37 is in a form leaving insulating parts 35 and 36 to a part of the circumference wherein the first and third contactors 32 and 34 come into contact therewith. The first and third contactors 32 and 34 come into contact with the disk 31 and are connected to the *a* and *b* contact points of the switch $SQ_2$. The second contactor 33 is connected to a common conductor 41. The insulating parts 25 and 26, and 35 and 36, which are formed on the conductive patterns 27 and 37 of both sliding disks 21 and 31, deviate in their phases from one another in such a way that the insulating parts are set so that any of them may come to the first or third contact position for both the sliding disks in each 1/4 rotation of the cam shaft 9 and related to one another on the cam shaft 9 so that their rotating positions may correspond to the deviating position of the cam 10.

In order to change over the magnetic heads 4 and 4' in accordance with the drive in the forward or backward direction of the tape, a switch $SP_2$ is provided between the magnetic heads 4 and 4' and a preamplifier 42. The output of the preamplifier 42 is connected via another switch $SQ_3$ to a speaker 44 through a main amplifier 43, on the one hand, and to a level discriminating circuit 47 through a rectifying circuit 45 and a time constant circuit 46, on the other hand.

The level discriminating circuit 47 has, for example, a known Schmitt circuit composition, and is switched ON by the operation of a tune selecting button S, which is provided on the outside, and maintains that condition until the output level of the time constant circuit 46 drops below a predetermined reference level. A relay Q is connected to the output side of the level discriminating circuit 47. The switches $SQ_1$, $SQ_2$ and $SQ_3$ are controlled in operation by the relay Q, as the contacts thereof.

A bistable multivibrator 48 carries out forward/backward reversing operation of the tape drive. A relay P is connected to the output of the bistable multivibrator 48. The switches $SP_1$ and $SP_2$ are controlled in operation by the relay P as the contacts thereof. The bistable multivibrator 48 is not only automatically reversed by the output of a termination detecting circuit 49 for the tape, but is also manually reversed by the operation of a forward playing button F or reverse playing button R. In this case, the termination detecting circuit 49 may comprise a switch which is short-circuited by conductive foil provided at an end of the tape, or a contact point which makes or breaks according to whether the reel shaft is rotating, or a switch which responds to the change of tape tension.

The operation of the apparatus of the invention is as follows. It is assumed that the apparatus carries out the reproducing operation in the forward direction under the conditions that the forward/backward direction selector switches 20 and 30, respectively, are set in a condition shown in FIG. 1. Each of the switches $SP_1$ and $SP_2$, and $SQ_1$, $SQ_2$ and $SQ_3$ is connected to the *a* contact point. In other words, in this case, the tape 3 is fed in the forward direction and is held between the capstan 5 and the pinch roller 6. The tune recorded in the upper track of the tape is played out via the magnetic head 4 and the speker 44. The power feed circuit for the driving means 12 of the cam shaft 9 from the power source 13 is broken during the time the contactors are at the insulating part 25 of the forward direction selector switch 20.

After the play in the forward direction has been completed and one termination of the tape 3 has been detected by the termination detecting circuit 49, the bistable multivibrator 48 is reversed, the relay P operates and the switches $SP_1$ and $SP_2$ connected thereto are changed over to the *b* contact point. Hence, a power feed circuit is closed from the power source 13 to the driving means 12 through the first and second contactors 32 and 33 of the backward direction selector switch 30 and said driving means operates so that the cam shaft 9, the cam 10 fitted thereto and the sliding disks 21 and 31 rotate.

After the insulating part 35 of the sliding disk 31 has rotated up to the position of the first contactor 32, however, the power feed loop opens and the rotation of the cam shaft 9 automatically stops. The cam 10 shifts the lever 7 to the third deviating position through the intermediary of the cam roller 8 during this time. As a result, the tape 3 is held between the other capstan 5′ and the other pinch roller 6′ and driven in the backward direction. Because the switch $SP_2$ is also at the *b* contact point in this case, the tune recorded on the lower track of the tape 3 is played via the other magnetic head 4′ and the speaker 44.

The operation of automatically reversing play at a termination of the tape is as hereinbefore described. The reversing operation at an arbitrary position by operation of a button is then as follows.

If the backward direction playing button R is depressed midway of the forward direction play in FIG. 1, a reversing signal is fed to the bistable multivibrator 48. The relay P is then operated by the reversing output thereof, so that the switches $SP_1$ and $SP_2$ are changed over to the *b* contact point. As a result, power feed circuit is closed to the driving means 12 through the contactors 32 and 33 of the backward direction selector switch 30. The cam shaft 9 rotates until the lever 7 comes to the third deviating position so that the pinch roller 6′ presses the tape 3 against the capstan 5′, in the same manner as in the aforedescribed automatic reverse.

The apparatus then turns out to the backward direction playing condition. From such time, the tune in the lower track of the tape is played.

Midway of the backward direction play, when the forward direction playing button F is depressed, the bistable multivibrator 48 is reversed again and the switches $SP_1$ and $SP_2$ return to the *a* contact point. Since the forward direction selector switch 20 is in a position turned in the direction of the arrow by 180°, that is, in the backward direction playing position in this case, a power feed circuit running through the contactors 22 and 23 is closed. When the cam shaft 9 is rotated, the forward direction selector switch returns to the position shown in FIG. 1, that is, the forward direction playing position. In this way, in the apparatus of the invention, a playing condition can be freely changed over from the forward direction play to the backward direction play or from the backward direction play to the forward direction play.

In the apparatus of the invention, the selecting operation of a tune is feasible with the forward and backward direction selector switches 20 and 30. That is, if it is desired to transfer from one tune to a next tune, for example, midway of the forward direction play, as shown in FIG. 1, a trigger signal is supplied to the level discriminating circuit 47 by depressing the tune selecting button S. The relay Q is operated by the output of the level discriminating circuit 47, so that the switches $SQ_1$, $SQ_2$ and $SQ_3$ are changed over to the contact point *b*.

As a result, a power feed circuit is closed from the power source 13 to the driving means 12 through the contact point *a* of $SP_1$, the contact point *b* of $SQ_1$, and the third contactor 24 and the second contactor 23 of the forward direction selector switch 20. The cam shaft 9 rotates until the insulating part 26 thereof comes to the position of the third contactor 24. In this condition, the lever 7 is moved to the second deviating position and two pinch rollers 6 and 6′ are moved to the positions apart from the capstans 5 and 5′. Therefore, the torque of a motor for driving the reel shafts 1 and 1′ increases so that the tape 3 is rapidly wound in the forward direction.

Figures 2A, 2B, 2C, 2D:
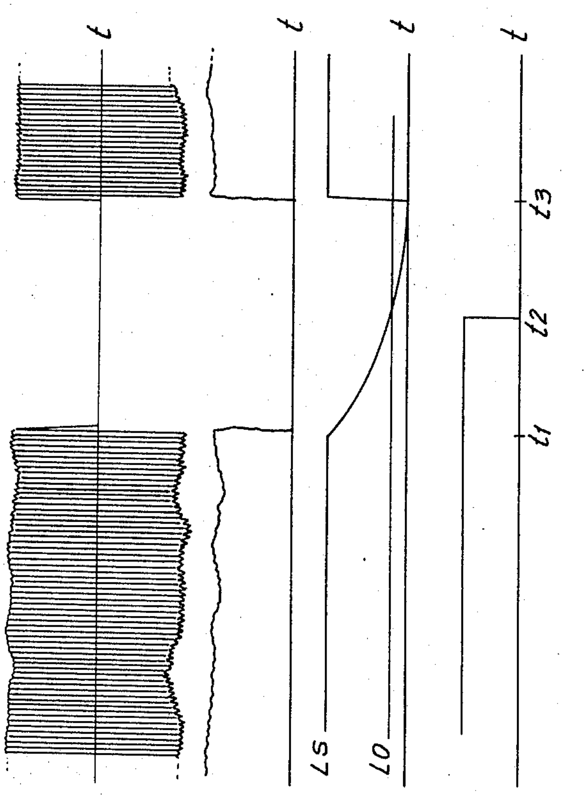

If the aforedescribed winding operation is started, an output in the compressed form of an audio waveform, as shown in FIG. 2*a*, appears at the output of the preamplifier 42. The output of the preamplifier 42 is fed to the rectifying circuit 45 through the switch $SQ_3$ which is connected beforehand to the contact point *b* by the relay Q. The output of the preamplifier 42 is added to the level discriminating circuit 47 through the time constant circuit 46, after it has been converted into a direct current waveform, as shown in FIG. 2*b*. FIG. 2*c* shows the output of the time constant circuit 46. FIG. 2*d* shows the output waveform of the level discriminating circuit 47.

If the reference level for the level discriminating circuit 47 is set to a value $L_0$, for example, approximately 10 percent of a signal means level $L_s$, the relay Q is maintained and the aforedescribed rapid winding mode is maintained until the output of the time constant circuit 46 drops below the level $L_0$ after the station selecting button S is released. In this case, the time constant circuit 46 operates to detect a tune interval position of tunes recorded on the tape. The time constant circuit 46 is composed so that the output thereof may drop below the reference level $L_0$ for the first time after a signal mode has been maintained for a longer time than the scattered non-signal intervals in a tune. If a non-signal mode is maintained from the time period $t_1$ to $t_2$ in FIGS. 2*a* to 2*d*, therefore, the level discriminating circuit 47 turns OFF at a tune interval position of the tape and the switches $SQ_1$, $SQ_2$ and $SQ_3$ connected to the relay Q return to the contact point *a*.

Since the sliding disk 21 of the forward direction selector switch 20 is in the position in which the insulating part 26 thereof is in contact with the third contactor 24, as hereinbefore mentioned, when the switches $SQ_1$, $SQ_2$ and $SQ_3$ have returned to the contact point *a*. A power feed circuit is closed running through the first contactor 22 and the second contactor 23, and the driving means 12 operates, so that the cam shaft 9 rotates again. When the sliding disk 21 rotates to its position shown in FIG. 1, the aforedescribed power feed circuit is opened at the insulating part 25, and the rotation stops, so that the play in the forward direction is carried out again from the next tune. In this way, it is feasible to select the starting position of any desired tune and to enjoy it.

Although the foregoing description concerns the tune selecting operation midway of the forward direction play, it is obvious that a similar tune selecting operation is also feasible midway of the backward direction play. In addition, it may be convenient if the level discriminating circuit 47 is composed to start also by the operation of the forward and backward selecting buttons F and R, respectively, that is, if the direction selecting buttons F and R and the tune selecting button S are commonly used for the purpose. This is because when the forward direction play is changed over to the backward direction play, and when the backward direction play is changed over to the forward direction play, the starting position of the next tune on the track is automatically selected to start the play.

The basic structure of the apparatus of the invention and the operation thereof have been hereinbefore described. However, various modifications are possible, as embodiments of the basic structure.

Figure 3:
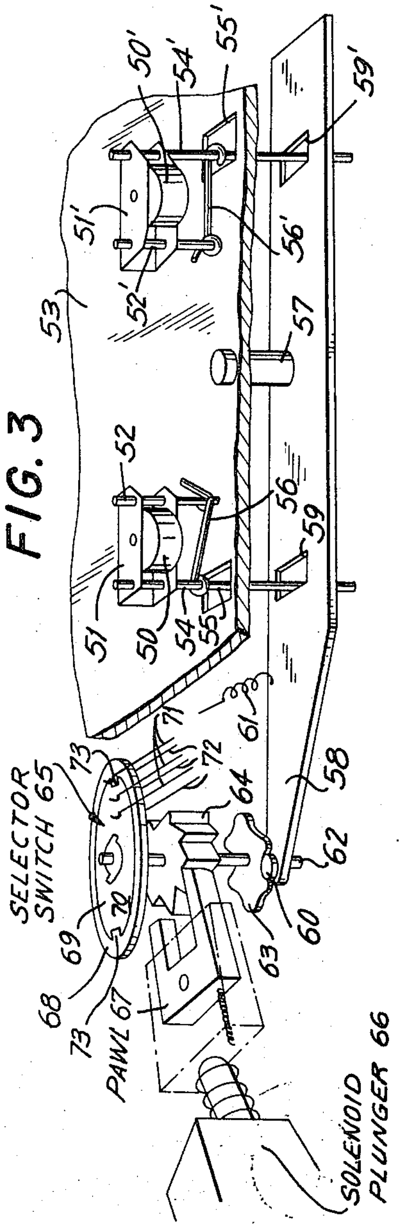
FIG. 3 is a perspective view of the main part of the apparatus of the invention.

FIG. 3 shows an embodiment of the supporting structure of the pinch rollers and the driving means of the cam shaft. The two pinch rollers 50 and 50' are supported on a base plate 53 by eccentric shafts 52 and 52' in a structure formed by holding members 51 and 51', respectively. Eccentric pins 54 and 54' are provided at the ends of the holding members 51 and 51'. The pins 54 and 54' extend downward through windows 55 and 55' formed through the base plate 53 and perpetually have a force applied thereto toward the side by springs 56 and 56'. A lever 58 is supported by a shaft 57 under the base plate 53. The lever 58 is provided with holes 59 and 59' which regulate the positions of the eccentric pins 54 and 54' on both sides of the shaft 57. The lever 58 is provided with a cam roller 60 at an end thereof, and it is pulled by a spring 61.

Figure 4A:
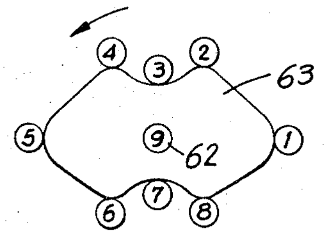
FIG. 4a is a schematic diagram of the cam plate 63.

A cam plate 63 supported by a cam shaft 62 is in a position opposite to the cam roller 60. In this case, the cam plate 63 has a shape as shown in FIG. 4*a* and gives the lever 58 a deviation of 2 cycles every rotation. In other words, when the cam roller 60 comes in contact with the positions indicated by the symbols (1) and (5), the lever 58 takes the first deviating position and the pinch roller 50 drives the tape in the forward direction between capstans (not shown in the drawing), while in the positions (3) and (7) the lever takes the third deviating position and drives the tape in the backward direction. Furthermore, in the positions (2), (4), (6) and (8), the lever 58 takes the second deviating position and the tape is rapidly wound in the forward or backward direction.

Figure 4B:
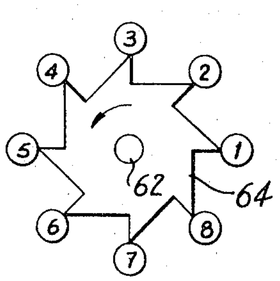
FIG. 4b is a schematic diagram of the ratchet wheel 64.
Figure 4C:
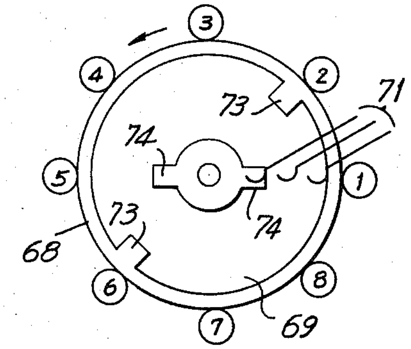
FIG. 4c is a schematic diagram of the conductive pattern 69.
Figure 4D:
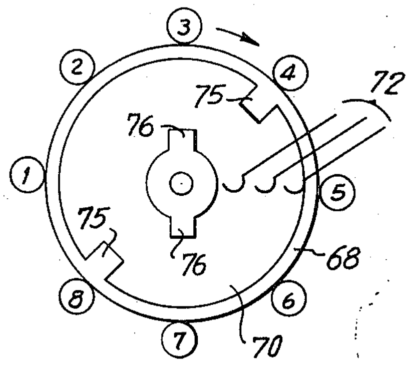
FIG. 4d is a schematic diagram of the conductive pattern 70.

A ratchet wheel 64 and a selector switch 65 are fitted to the cam shaft 62. The ratchet wheel 64 has eight teeth corresponding to the cam plate 63, as shown in FIG. 4b, and is rotated tooth by tooth by a solenoid plunger 66 provided as a driving means and by a pawl 67 (FIG. 3). The selector switch 65 consists mainly of an insulating plate 68. The surface of the insulating plate 68 is provided with a conductive pattern 69 forming the forward direction selecting switch. The other surface of the insulating plate 68 is provided with a conductive pattern 70 forming the backward direction selecting switch. Two sets of three contactors 71, and 72 are respectively brought into contact with the conductive patterns 69 and 70. Insulating parts 73 and 74, and 75 and 76 are formed on the conductive patterns 69 and 70, respectively, as shown in FIGS. 4*c* and 4*d*. The cam plate 63, the ratchet wheel 64 and the selector switch 65 are fixed on the cam shaft 62 so that the phases indicated by the symbols (1) to (8) in FIGS. 4*c* and 4*d* coincide with one another.

The aforedescribed embodiment of the invention consequently performs the changing-over of forward/backward plays and the tune selecting, as required.

It is thus obvious that the apparatus of the present invention provides a remarkable effect in practice, in particular as a tape player carried in a car. The apparatus uses a cassette tape because the changing-over of forward/backward plays and the tune selecting may be performed by a simple button operation.

While the principles of the invention have been described in connection with a specific embodiment of a tape player using a cassette tape, it is to be clearly understood that this description is made only by way of example and not as a limitation on the scope of invention, and it is obvious that the applications thereof to a magnetic recording and reproducing apparatus of open reel type and the like are possible.

We claim:

1. Magnetic recording and reproducing apparatus including a magnetic tape and magnetic heads in operative proximity with the tape, said apparatus comprising a pair of capstans rotating in opposite directions on both sides of a magnetic head and in operative proximity with the tape; a lever; a pair of pinch rollers mounted on the lever each positioned opposite a corresponding one of the capstans on the other side of and in operative proximity with the tape; a cam shaft; electrical driving means coupled to the cam shaft for rotating said cam shaft; a cam plate affixed to the cam shaft for rotation therewith, said cam plate controlling the position of the lever relative to the tape; a forward direction selector switch affixed to the cam shaft and having a plurality of contactors which open and close electrical contacts in accordance with the rotary position of the switch; a backward direction selector switch affixed to the cam shaft and having a plurality of contactors which open and close electrical contacts in accordance with the rotary position of the switch; a source of voltage; a double contact point switch connected between the source of voltage and the contactors of the forward direction selector switch in one position and between the source of voltage and the contactors of the backward direction selector switch in another position; energizing means having a forward selecting switch and a backward selecting switch for selectively changing the position of the double contact point switch; and circuit means connecting the energizing means through the contactors of the forward and backward direction selector switches to the electrical driving means in a manner whereby electrical energy is supplied to said driving means in accordance with the position of the lever relative to the tape and therefore in accordance with the position of the pinch rollers mounted thereon relative to the tape.

2. Magnetic recording and reproducing apparatus as claimed in claim 1, wherein the lever and therefore the pinch rollers mounted thereon are positionable in three different positions relative to the tape.

3. Magnetic recording and reproducing apparatus as claimed in claim 1, wherein the electrical driving means comprises a solenoid plunger having a pawl, the solenoid plunger and the cam shaft are coupled by a ratchet wheel.

4. Magnetic recording and reproducing apparatus as claimed in claim 1, wherein each of the forward and backward direction selector switches comprises a sliding disk having an insulating plate having conductive patterns on both surfaces thereof, and two sets of contactors each for a corresponding one of the conductive patterns, each set having three contactors, said disks being affixed to the cam shaft for rotation therewith.

5. Magnetic recording and reproducing apparatus as claimed in claim 1, wherein the lever has a pair of spaced holes formed therein, and further comprising a base plate affixed to the lever in spaced relation therewith and having a pair of spaced holes formed therethrough, holding members movably mounted on the base plate for supporting the pinch rollers, and a pair of deviating pins each extending from a corresponding one of the holding members and each passing through a corresponding hole through the base plate and a corresponding hole through the lever.

6. Magnetic recording and reproducing apparatus as claimed in claim 1, wherein the circuit means includes another double contact point switch interposed between the first-mentioned double contact point switch and a direction selector switch, and further comprising energizing means having a tune selecting switch for selectively changing the position of the other double contact point switch, said other double contact point switch returning to its other position when a non-recording portion of the tape is detected by the magnetic head.

* * * * *